US007734995B1

(12) United States Patent
Saikaly

(10) Patent No.: US 7,734,995 B1
(45) Date of Patent: Jun. 8, 2010

(54) SYSTEMS AND METHODS FOR ASSEMBLING FORM FRAGMENTS AND TEMPLATES INTO A FORM PACKAGE

(75) Inventor: Danny Saikaly, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 1223 days.

(21) Appl. No.: 11/293,625

(22) Filed: Dec. 1, 2005

(51) Int. Cl.
*G06F 17/00* (2006.01)

(52) U.S. Cl. ........................ 715/200; 715/222; 715/209

(58) Field of Classification Search ................. 715/212, 715/21, 222, 224; 705/51, 80
See application file for complete search history.

(56) References Cited

U.S. PATENT DOCUMENTS 5,860,073 A * 1/1999 Ferrel et al. ................. 715/255
5,946,701 A * 8/1999 Hamada ..................... 715/210
6,006,242 A * 12/1999 Poole et al. ................. 715/209
6,366,918 B1 * 4/2002 Guttman et al. ............. 707/100
7,019,858 B1 * 3/2006 Gopalasamy .............. 358/1.15
7,035,837 B2 * 4/2006 Reulein et al. ................. 707/1
2002/0019885 A1 * 2/2002 Sleeper ....................... 709/318
2002/0194219 A1 * 12/2002 Bradley et al. .............. 707/506
2003/0172168 A1 * 9/2003 Mak et al. ................... 709/230
2003/0182450 A1 * 9/2003 Ong et al. ................... 709/246
2003/0187935 A1 * 10/2003 Agarwalla et al. .......... 709/206
2004/0003350 A1 * 1/2004 Simmons et al. ............ 715/517
2004/0039990 A1 * 2/2004 Bakar et al. ................. 715/505
2004/0194028 A1 * 9/2004 O'Brien ...................... 715/517
2004/0230886 A1 * 11/2004 Livshits ...................... 715/500
2005/0120298 A1 * 6/2005 Petrujkic .................... 715/511
2005/0188300 A1 * 8/2005 Sweet et al. ................ 715/514
2005/0268229 A1 * 12/2005 Wessling et al. ............ 715/528
2006/0123033 A1 * 6/2006 Livshits ...................... 707/101
2006/0136810 A1 * 6/2006 Truong et al. ............... 715/507
2006/0156225 A1 * 7/2006 Burago et al. ............... 715/517
2006/0268339 A1 * 11/2006 Tsai .......................... 358/1.15
2006/0279783 A1 * 12/2006 Kato ......................... 358/1.18
2007/0130505 A1 * 6/2007 Woods ....................... 715/505
2007/0244964 A1 * 10/2007 Challenger et al. .......... 709/203
2007/0271185 A1 * 11/2007 Engler et al. .................. 705/51

OTHER PUBLICATIONS

Editor: Robin Cover Title: Enhanced Adobe XML Architecture Supports XML/PDF Form Designer and XML Data Package (XDP). Date: Jul. 15, 2003.*

* cited by examiner

*Primary Examiner*—Doug Hutton
*Assistant Examiner*—Mustafa Amin
(74) *Attorney, Agent, or Firm*—Schwegman Lundberg & Woessner, P.A.

(57) ABSTRACT

Systems and methods receive link fragments and component fragments for assembly into a template. The component fragments comprise editable portions of a document. The link fragments comprise references to other component fragments. A further aspect of the systems and methods includes assembling multiple templates into a formset. The templates included in the formset may be dynamically selected at runtime. Conflicts between references in the templates that make up the formset are resolved and a new form may be created.

21 Claims, 10 Drawing Sheets

Formset 206
Template A 204.1
Form Fragment 202.1
Form Fragment 202.2
Form Fragment 202.3
Form Fragment 202.4
Template B 204.2
Form Fragment 202.1
Form Fragment 202.5
Index Refer. 210
Form Fragment 202.4
Template C 204.3
Form Fragment 202.6
Form Fragment 202.7
Form Fragment 202.8

Figure 6B:
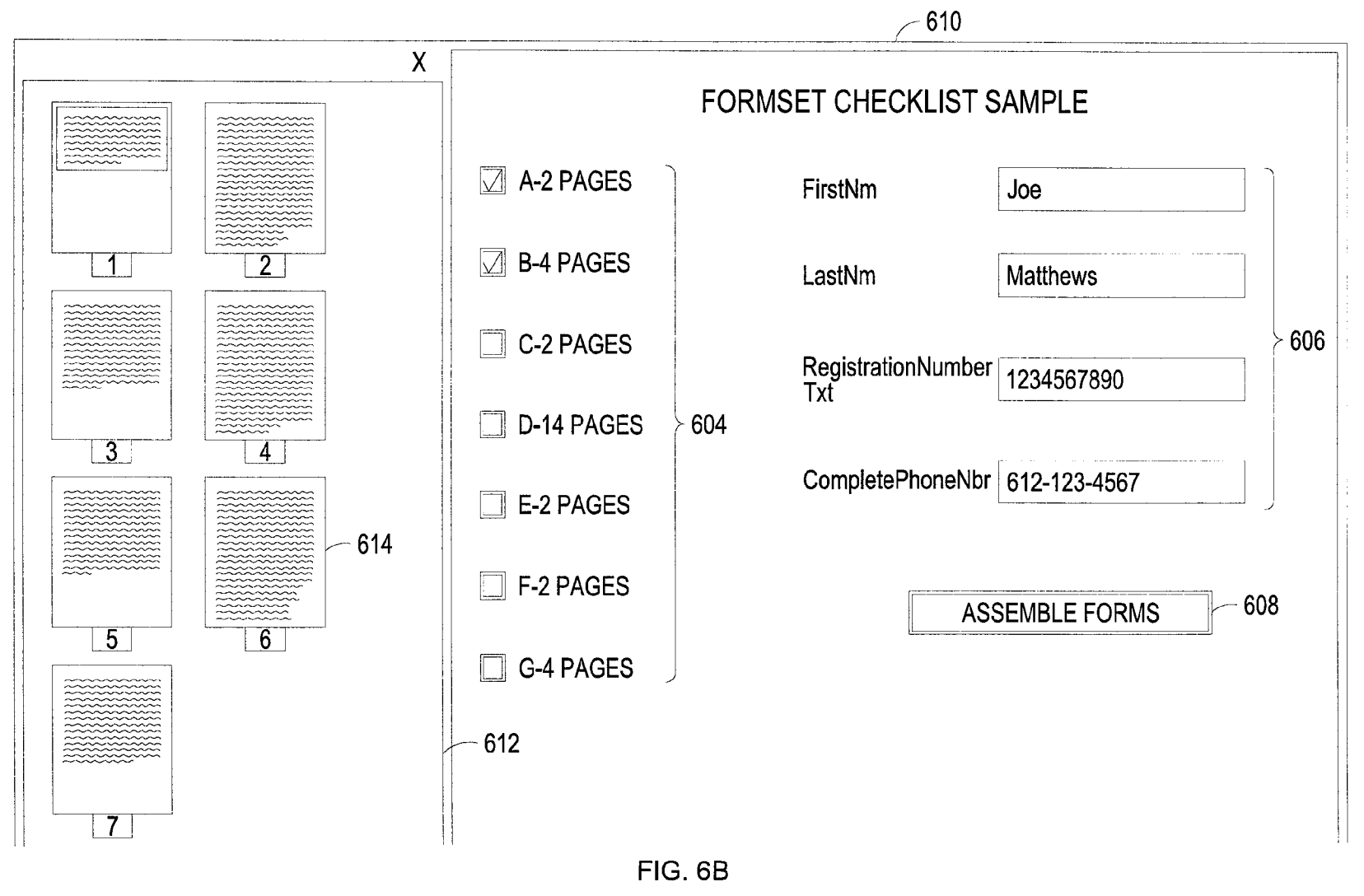

FORMSET CHECKLIST SAMPLE

604

A-2 PAGES
B-4 PAGES
C-2 PAGES
D-14 PAGES
E-2 PAGES
F-2 PAGES
G-4 PAGES

606

FirstNm | Joe
LastNm | Matthews
RegistrationNumber Txt | 1234567890
CompletePhoneNbr | 612-123-4567

608

ASSEMBLE FORMS

SYSTEMS AND METHODS FOR ASSEMBLING FORM FRAGMENTS AND TEMPLATES INTO A FORM PACKAGE

FIELD

The embodiments relate generally to creating, editing and processing documents, and more particularly to assembling form fragments and templates into a document package.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

From the very beginning of written expression, documents have been an important part of many business, political and personal transactions. Technology advances have led to improved methods of document processing. For example, the application of computer systems to document processing has made document creation, editing, management and distribution easier than ever before. For example, a forms package may be electronically created, edited, and distributed.

In current systems, a document package is typically assembled using preexisting documents. That is, a user may select one or more completed documents for insertion into a set of forms that make up the document package. Such document packages are common in the insurance, financial services and other industries that require documents upon the occurrence of various events. Because the same documents may be used in different packages, current systems allow for efficient use of documents by allowing users to create document packages that reuse the same document in multiple packages.

SUMMARY

Systems and methods receive a selection of form fragments at runtime and assemble the form fragments into a template. One aspect of the systems and methods includes receiving link fragments and component fragments for assembly into a template. The component fragments comprise editable portions of a document. The link fragments comprise references to other component fragments.

A further aspect of the systems and methods includes assembling multiple templates into a formset. The templates included in the formset may be dynamically selected at runtime. Conflicts between references in the templates that make up the formset are resolved and a new form may be created.

The present application describes systems, methods, and computer-readable media of varying scope. In addition to the aspects and advantages described in this summary, further aspects and advantages will become apparent by reference to the drawings and by reading the detailed description that follows.

BRIEF DESCRIPTION OF THE DRAWINGS

FIGS. 6A and 6B are example screen shots illustrating a user interface according to embodiments of the invention.

DETAILED DESCRIPTION

Figure 1:
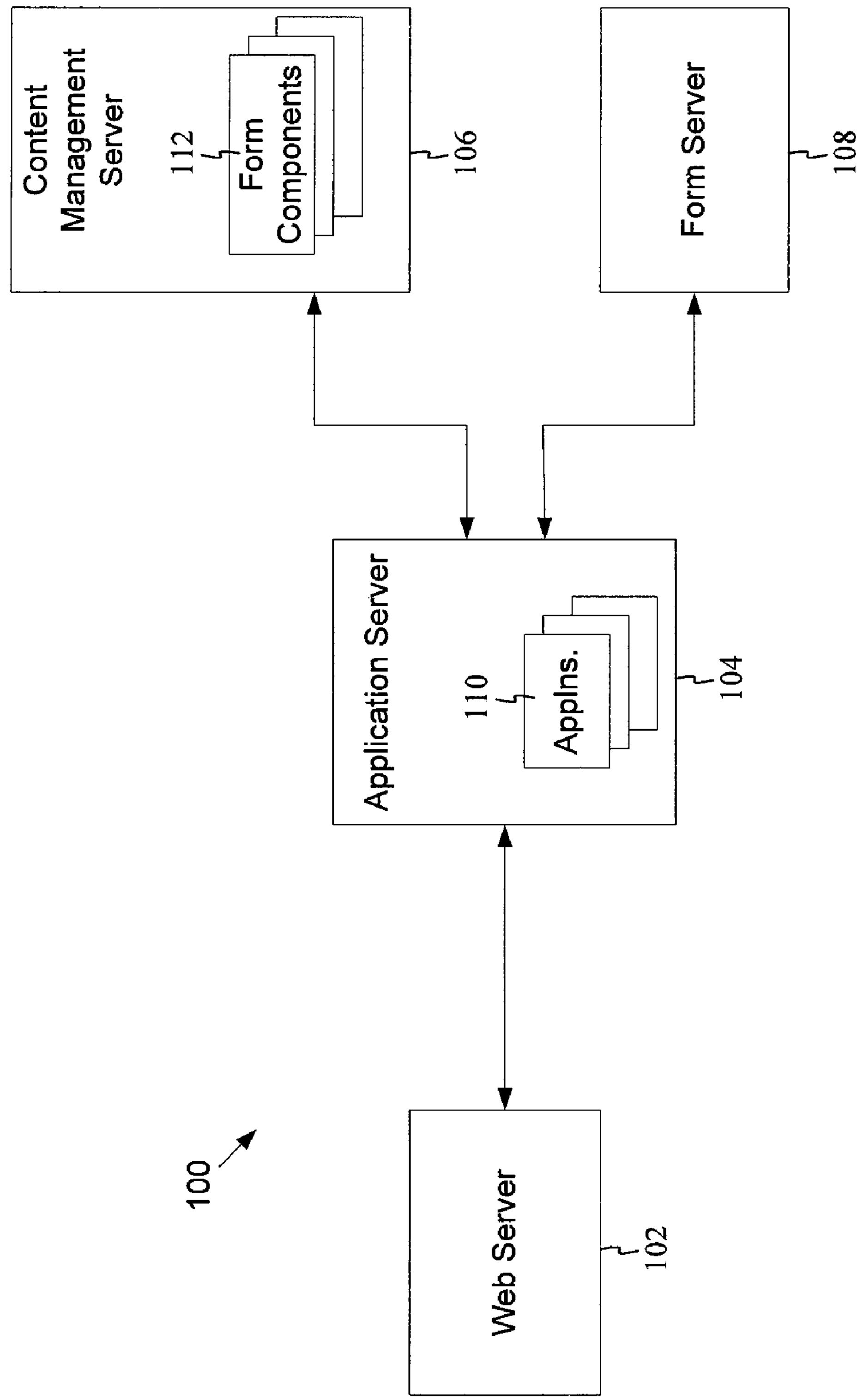
FIG. 1 is a block diagram illustrating a service configuration according to an example embodiment.

In the following detailed description of example embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the inventive subject matter.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as “processing” or “computing” or “calculating” or “determining” or “displaying” or the like, refer to the action and processes of a computer system, or similar computing device, that manipulates and transforms data represented as physical (e.g., electronic) quantities within the computer system’s registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

As discussed above, current systems allow for some efficient reuse of documents. However, several issues remain. For example, it is often necessary to make a change to the document. For example, a company logo may change, a regulation may issue or change that mandates a change in the language of a document, or a procedure outlined in a document may need to be updated. In current systems, every document that includes the changed content must be updated. This can be quite costly when thousands of documents may be involved.

Furthermore, in current systems the document is the smallest unit that can be reused. Oftentimes, several documents may share the same language in some portion of a document. Further, many forms require similar information (e.g. name, address, phone number etc.). Current systems typically do not allow the dynamic selection of a portion of a document to be reused in other documents.

Additionally, in current systems, the document layout and content is specified at design time (e.g. when the document is created). There is typically no mechanism for a downstream or end-user of a document to specify the content or layout of a form after it has been designed.

FIG. 1 is a block diagram illustrating a service 100 configuration according to an example embodiment. In some embodiments, server configuration 100 includes a web server 102, an application server 104, a content management server 106 and a form server 108.

Web server 102 provides a user interface for users to select applications 110 that execute on application server 104. In an example embodiment, various applications 110 provide for the runtime selection of form fragments, templates and forms for inclusion in a form or formset. In some embodiments, the web server 102 may be isolated from the other servers by using firewalls to establish a "demilitarized zone". The web server 102 may thus be accessible to users while the other servers are protected from direct access by users.

Application server 104 provides one or more applications 110 that execute functions and methods invoked through a user interface presented through web server 102 that implement business logic with respect to generating forms, formsets and/or letters. In some embodiments, application server 104 includes applications 110 that utilize functions and methods described below with reference to FIGS. 4 and 5 below. In an example embodiment, an application 110 is a Java based application, and the application may be packaged in a Java archive (.jar) file.

Content management server 106 provides software that manages document components 112. The document components 112 include form fragments, forms, templates, documents and/or formsets. In some embodiments, the content management server provides the ability to save and retrieve form fragments, forms, templates and other content. In addition, the content management server 106 may provide the ability to save various versions of the document components 112. Further details on the document components 112 are provided below with reference to FIG. 2.

The individual components of document components 112 may be files in a file system or objects in a database. The individual components may be identified by a path and file name, a URL (Uniform Resource Locator), or by a unique identifier such as a GUID (Globally Unique Identifier). Document components 112 may be organized in varying ways, including separating various components under separate directories or folders in a file system. As an example, one of applications 110 on application server 104 may be directed to providing insurance forms for California, while another of applications 110 may be directed to providing insurance forms for Florida. Due to regulatory differences, the content of the forms must be different. In this case, one directory may contain document components for California while the other document directory may contain document components for Florida. Those of skill in the art will appreciate that the example provided is but one example of many ways that document components could be organized on a content management system.

Form server 108 operates to render documents from templates and other document sources. In addition, form server 108 may generate control files and PostScript® language files used to fax and/or print documents. In some embodiments, form server 108 is the Adobe Form Server version 6 product available from Adobe Systems Inc.

Figure 2:
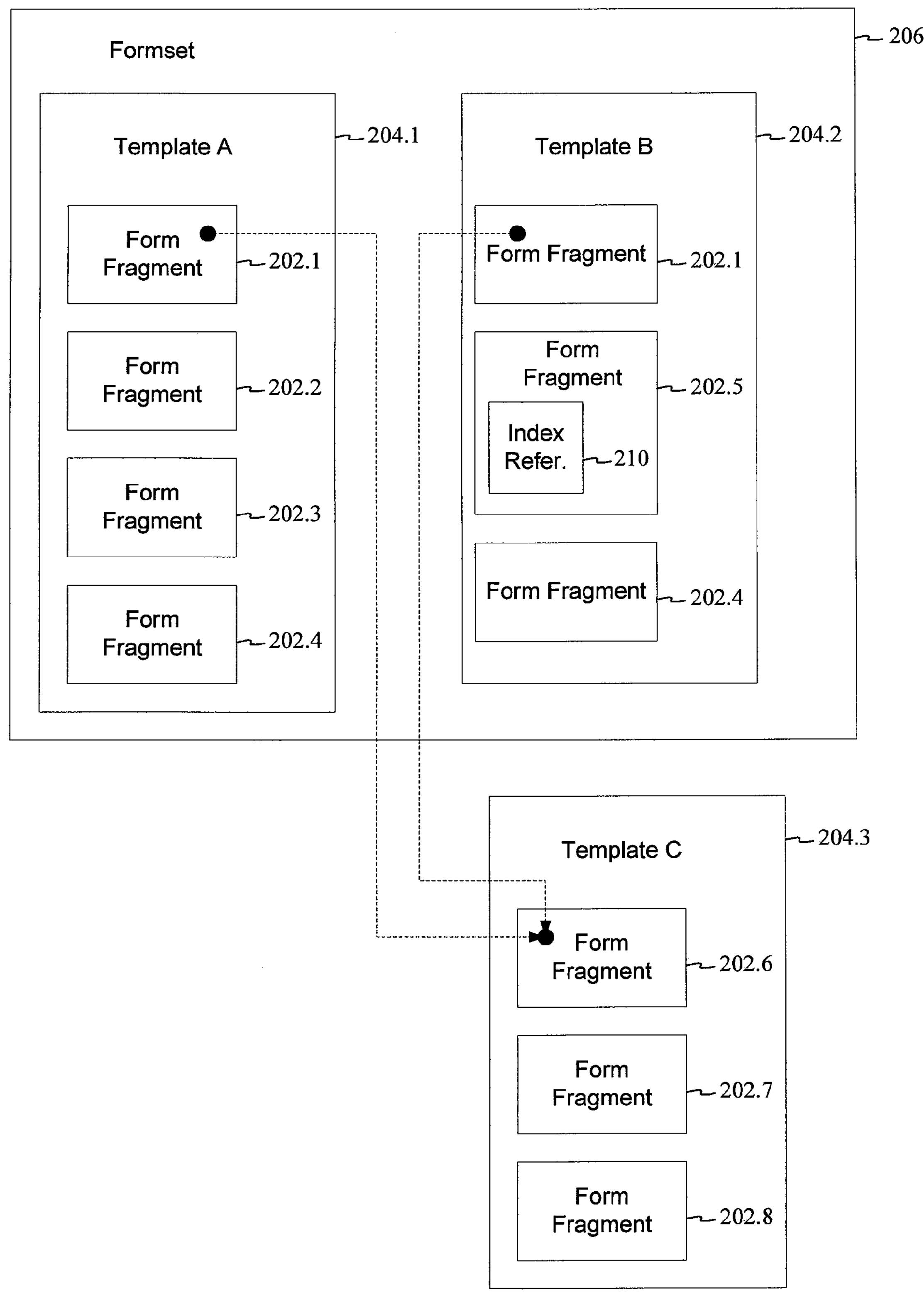
FIG. 2 is a block diagram illustrating various components of a form and formset package according to example embodiments of the invention.

FIG. 2 is a block diagram illustrating various components of a form and formset package according to example embodiments of the invention. In some embodiments, the components include form fragments 202, templates 204 and formsets 206. In some embodiments, form fragments 202, templates 204 and formsets 206 may be specified using XML (eXtensible Markup Language) and conform to the XDP (XML Data Package) and XFA (XML Form Architecture) specifications. XFA defines a template based approach for building documents. XFA provides data presentation, capture, calculation and editing features. XFA distinguishes between templates and content.

XDP is an XML grammar that provides a mechanism for packaging XFA components within a surrounding XML container. The XFA components may include a PDF (Portable Document Format) document, PDF subassemblies (annotations and data), XFA templates, XFA form data and other XFA components. Further details on XDP and XFA may be found in "XFA Specification" version 2.2, published October 2004 by Adobe Systems Incorporated.

Form fragments 202 include data defining individual portions of a document. Examples of such portions include headers, footers, and document body portions. In some embodiments, a form fragment comprises a subform, and includes subform parameters controlling the positioning and structure of the subform. A subform is an object that acts as a container for other document objects, including fields, boilerplate objects, and other subforms. The use of subforms helps to position objects relative to each other and provide structure in dynamic form designs. The positioning may be relative to other subforms in a template 204 or it may be absolute.

A form fragment 202 may include other form fragments. Additionally, a form fragment 202 may define a portion of a page on a form, a page of a form, multiple pages of a form, or an entire form. Further, a form fragment 202 may include a template definition. In an example embodiment, a form fragment may be stored on content management server 106 as an individual file conforming to the XDP format. The following XML excerpt illustrates a fragment definition according to an example embodiment:

```
<fragment>
<subform name="fragment.xdp" GUID="DFFD57
  DB-6399-7B . . . 4"/>
</fragment>
```

where:

| | |
|---|---|
| <fragment>: | root element that identifies the XDP as a fragment |
| <subform name>: | attribute that identifies the name of the XDP template |
| <subform GUID>: | unique identifier attribute that maps back to a content management location. |

A form fragment 202 may define a form component or a form link. A form component is a section of a document that contains content that can be edited by a form editor such as Adobe® LiveCycle™ Designer available from Adobe Systems Incorporated of San Jose, Calif. This content may be processed and rendered in relation to the other form fragments in a template.

A form link contains a reference to another form fragment contained in another template 204. In the example illustrated in FIG. 2, form fragment 202.1 is a link to form fragment 202.6. Thus when the template 204.1 is rendered, it is the content of form fragment 202.6 that is rendered by reference from fragment 202.1.

Template 204 includes one or more form fragments 202 defining portions of a template. Templates may be used to provide presentation rules, calculations, and interaction rules for a form. Content typically comprises data that is processed according to the template.

In the example illustrated in FIG. 2, template 204.1 includes four fragments, 202.1-202.4. As an example, form fragment 202.1 may define a header section for a form, form fragment 202.2 may define body content for the form, form fragment 202.3 may define a finable form section to be completed by the recipient, and form fragment 202.4 may define a footer section for the form.

In the example shown in FIG. 2, template 204.2 also contains a link to form fragment 202.6 through form fragment 202.1. In addition, template 204.2 also contains a form fragment 202.5 which may define body content for a letter and form fragment 202.4 that defines a footer section.

Thus a form rendered from templates 204.1 and 204.2 will have the same header and footers as defined by form fragments 202.1 and 202.4. The documents will have different body content as defined by form fragments 202.2, 202.3 and 202.5.

Form fragments may contain one or more index references 210. An index references comprises a reference to a form object. Various types form objects exist that may be referenced by an index value. The object referred to by the index value may be in another form fragment or template from the referring form fragment. In an example embodiments, such form objects include page numbers, page sizes, page orientation (e.g., landscape or portrait), and form unique identifiers. A form unique identifier may be used to identify an object in a form. For example, a unique identifier may be used to identify a field in a form.

A formset 206 comprises a collection of two or more top-level templates. A top-level template is one that is not included as part of another template. Each of the templates behaves as a link or component to an individual form. The top-level template may be a master template for a form that may be used as a starting point for designing a form. A master template may include form objects or fragments that define the page size and page orientation for a first page of a form.

The templates 204.1 and 204.2 have been shown with four fragments and three fragments respectively. Those of skill in the art will appreciate that a template may contain any number of form fragments in varying combinations of form components and form links. The embodiments of the invention are not limited to any particular number of form fragments within a template.

Figure 3:
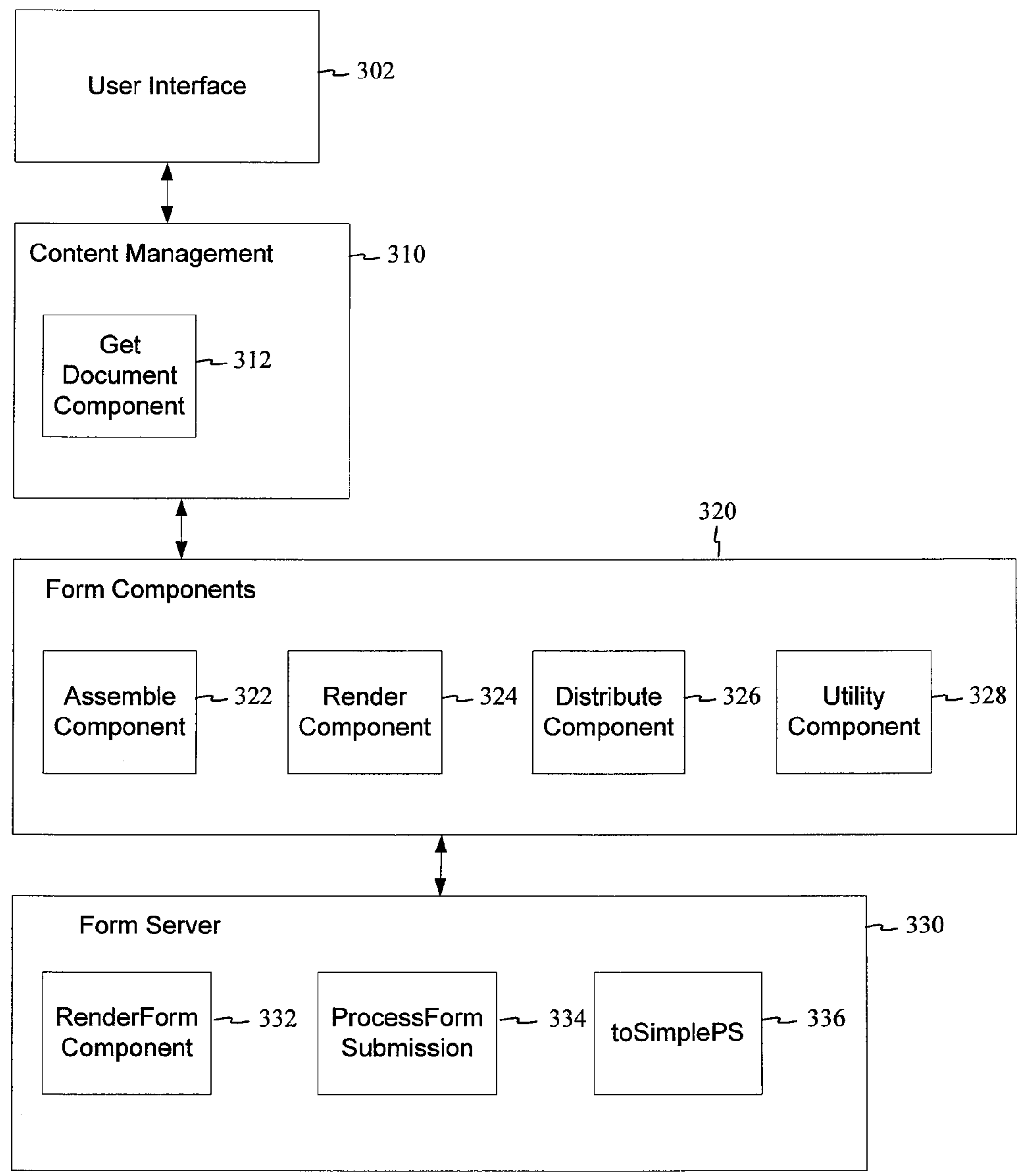
FIG. 3 is a block diagram illustrating various logical components of a software system according to example embodiments of the invention.

FIG. 3 is a block diagram illustrating various logical components of a software system 300 according to example embodiments of the invention. The components of software system 300 may be included in an application 110 (FIG. 1). In some embodiments, software system 300 includes a user interface 302, content management components 310, form components 320, and form server components 330. User interface 302 includes components that provide a mechanism for a user to select documents, formsets, templates, form fragments, and other items for editing, rendering and/or distribution. In some embodiments, user interface 302 is a web based interface that provides web pages containing user interface elements allowing a user to select documents, templates and form fragments and the operations to be performed on them. Those of skill in the art will appreciate that other user interfaces may be used and are within the scope of the embodiments of the invention.

Content management components 310 are accessible by user interface 302 and include a get document component 312 that provides the ability to retrieve formsets, documents, templates and form fragments from a content management system (not shown). The content management system may be a document repository, a database system, a file system, or other content management system capable of identifying and storing documents, formsets, templates, and form fragments.

Additionally, in varying embodiments content management system 310 may provide security components, authorization components, authentication components and a MVC (Model View Controller) framework.

Form components 320 include an assemble component 322, render component 324, distribute component 326 and utility component 328. Assemble component 322 includes functions and methods that control the assembly of form fragments, templates and formsets.

Render component 324 includes functions and methods that create and merge documents based on template definitions assembled by the assemble component 322.

Distribute component 326 includes functions and methods that deal with the distribution of a document for faxing and printing. In some embodiments, distribute components 326 create PostScript language files for faxing and printing.

Utility component 328 includes functions and methods that create, read, write and append XML files. As noted above, some embodiments use XML and XDP to aid in the definition of forms and templates. The utility component functions and methods can be used to append form fragments and templates to create or modify templates or formsets.

Form server components 330 include functions and methods that access a form server (not shown) that provides the ability to generate forms, merge data onto forms, and manipulate rendered documents such as PDF files.

Figure 4:
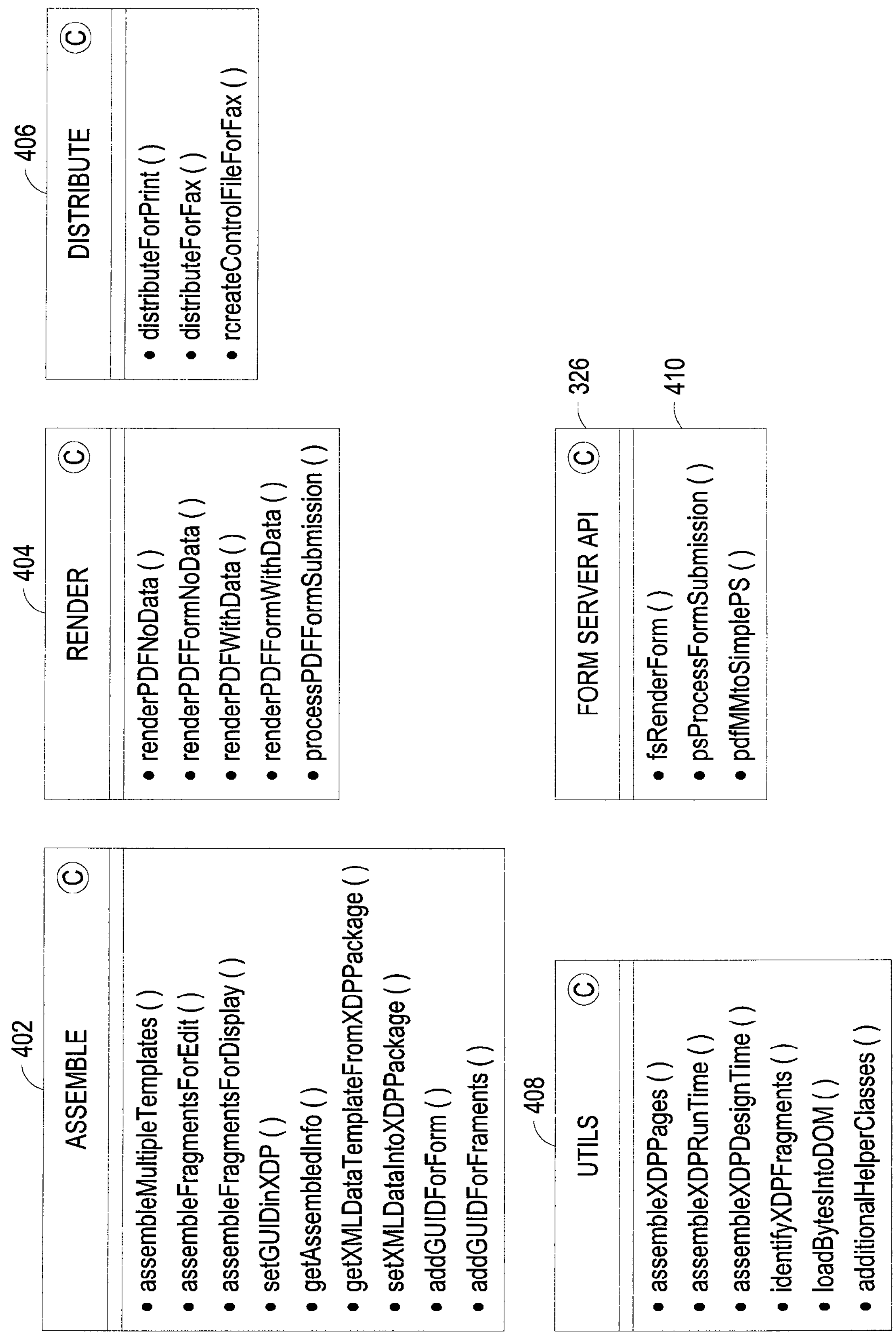
FIG. 4 is a block diagram illustrating various classes and class methods used in example embodiments of the invention.

Further details on the functions and methods provided by the components above will now be provided with reference to FIG. 4. FIG. 4 is a block diagram illustrating various classes and class methods used in example embodiments of the invention. In some embodiments, the classes and class methods are defined using the Java programming language, and the components above are distributed as Java ".jar" files. Those of skill in the art will appreciate that other programming languages could be used to define the functions and interfaces described below.

Assemble class 402 in some embodiments may include combinations of one or more the methods defined below in Table 1:

TABLE 1

| Method Name | Purpose |
|---|---|
| getXMLDataFromXDPPackage | Extract XML from an XDP package. May be used to retrieve data from a template in an XDP package in order to render a prefilled PDF document |
| setXMLDataIntoXDPPackage | The ability to insert XML form data into an XDP template. This allows both the XDP template associated data to be stored into a content repository as one file. |
| addGUIDForForm | Add XML metadata to form along with a GUID (Globally Unique ID). Allows the adding of a GUID to identify the form. |
| addGUIDForFragment | Add XML metadata to form fragment along with a GUID. Once a Template fragment has been added to a resposi-tory during design time, this function will write the metadata to the template for reference at runtime. |
| getAssembledInfo | Read metadata identifying the fragment names and GUID's associated with an XDP. At runtime, a user selects a template to fill out, this function will retrieve the list of fragments associated with that template to ensure that the most recent fragments are used in the document assembly. |
| assembleFragmentsForEdit | Create a form Template for editing at design time. Will also write metadata to the template. The resulting XDP may include visual indicators to distinguish form components from form links. Additionally, template metadata will be added to the XDP. |
| setGUIDInXDP | Sets the value of the specified GUID within the Adobe meta data. At design time, this data can be added when a user uploads a new form Template using Template Manager or at runtime where a "Snapshot"/new GUID may have to be added to the Template. |
| assembleFragmentsForDisplay | Create a run-time XDP Template. A user requests a template to fill out a form or letter. Once the fragments have been identified (getAssembledInfo). A caller can call this function to generate an up-to-date version of the template, which can be archived or used to generate a PDF version of the form. |
| assembleMultipleTemplates | Create a run-time XDP Template which represents a Formset. This can be used both at design-time and at run-time. A user selects various templates that will comprise their formset. Once all templates and their fragments have been identified and created, a caller can call this method to generate a new formset. |

Render class 404 in some embodiments may include combinations of one or more the methods defined below in Table 2:

TABLE 2

| Method Name | Purpose |
|---|---|
| renderPDFNoData | Creates a blank, non-interactive PDF version of the XDP template. This may be used during the design and approval stage of a template. This method provides the form designer with the option to view a blank, PDF version of a form or formset. |
| renderPDFFormNoData | Creates a blank, interactive PDF version of the XDP Template. As with the renderPDFNoData call, this method may be used during the design and approval stage of the Template. In addition it may be used when an application requests a fillable form where there is no appropriate data available |
| renderPDFWithData | Merges an XML data file with an XDP template to create a populated, non-interactive PDF. This function may be called in several situations. At the design and approval stage it may be used to render a form for viewing or approval. At run-time it may be used for archiving, previewing and distribution. |
| renderPDFFormWithData | Merges an XML data with an XDP template to create a populated, interactive PDF Form. This function may be called in several situations. At the design and approval stage it may be used to render a form for viewing and testing, or approval. At runtime it may be used to allow the user to complete and modify a document. |
| processPDFFormSubmission | To allow the further processing of a form submission. This method allows server side calculations to execute and validate data. This function may be used when a user clicks a submit button on the form and the application wants to identify what button was clicked. It can also be used to validate server side calculation and execute server side form based scripting. |

Distribute class 406 in some embodiments may include combinations of one or more the methods defined below in Table 3:

TABLE 3

| Method Name | Purpose |
|---|---|
| distributeForPrint | Generates a PostScript language file for batch printing. This method may be used for batch printing. |
| distributeForFax | Generates a PostScript language file for faxing. This method may be used for faxing and prepending DSC (Document Structure Convention) info to the PostScript language file. |
| createControlFileForFax | Generates a control file that points to the PostScript language file that is needed for faxing. This file will contain fax specific info such as fax number, name. |

Utility class 408 in some embodiments may include combinations of one or more the methods defined below in Table 4:

TABLE 4

| Method Name | Purpose |
|---|---|
| assembleXDPPages | Create body/master pages required for XDP templates. |
| assembleXDPRunTime | Create XDP templates and formsets. |
| assembleXDPDesignTime | Create XDP templates and formsets and bind with Schema. |

TABLE 4-continued

| Method Name | Purpose |
|---|---|
| identifyXDPFragments | List the XDP templates that comprise a Template or Formset. |
| loadBytesIntoDOM | Load an XDP or XML file into a DOM (Document Object Model) for manipulation. |

FormServer class 410 in some embodiments may include combinations of one or more of the methods defined below in Table 5:

TABLE 5

| Method Name | Purpose |
|---|---|
| fsRenderForm | Access the Form Server API to generate a PDF document from a template. |
| fsProcessFormSubmission | Process a form submission at runtime. |
| pdfMMtoSimplePS | Access the Form Server PDF manipulation module API. |

It should be noted that the class names, method names, and method functionality described above are examples. Alternative embodiments may use differing class names and method names to provide similar functionality. Additionally, the functions provided by the methods described above may be distributed in differing classes and methods then those described above.

Figure 5A:
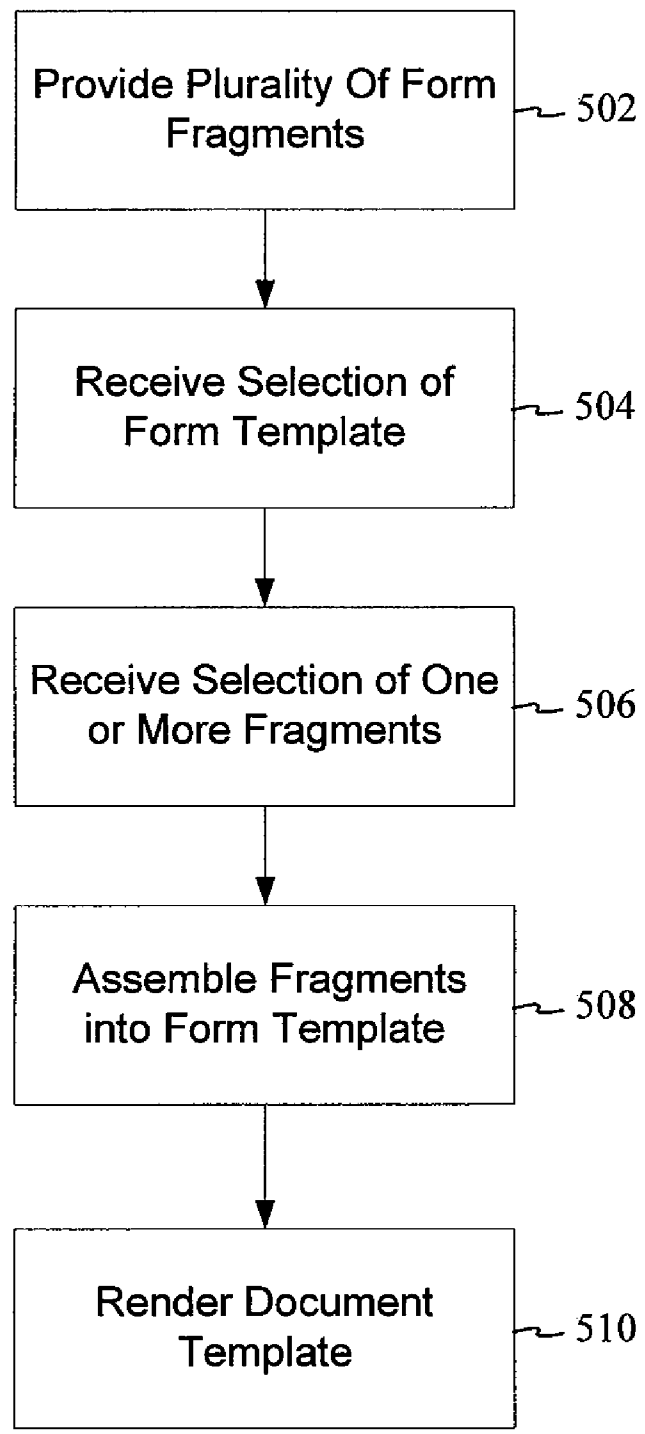
FIGS. 5A-5C are flowcharts illustrating methods according to embodiments of the invention.
Figure 5B:
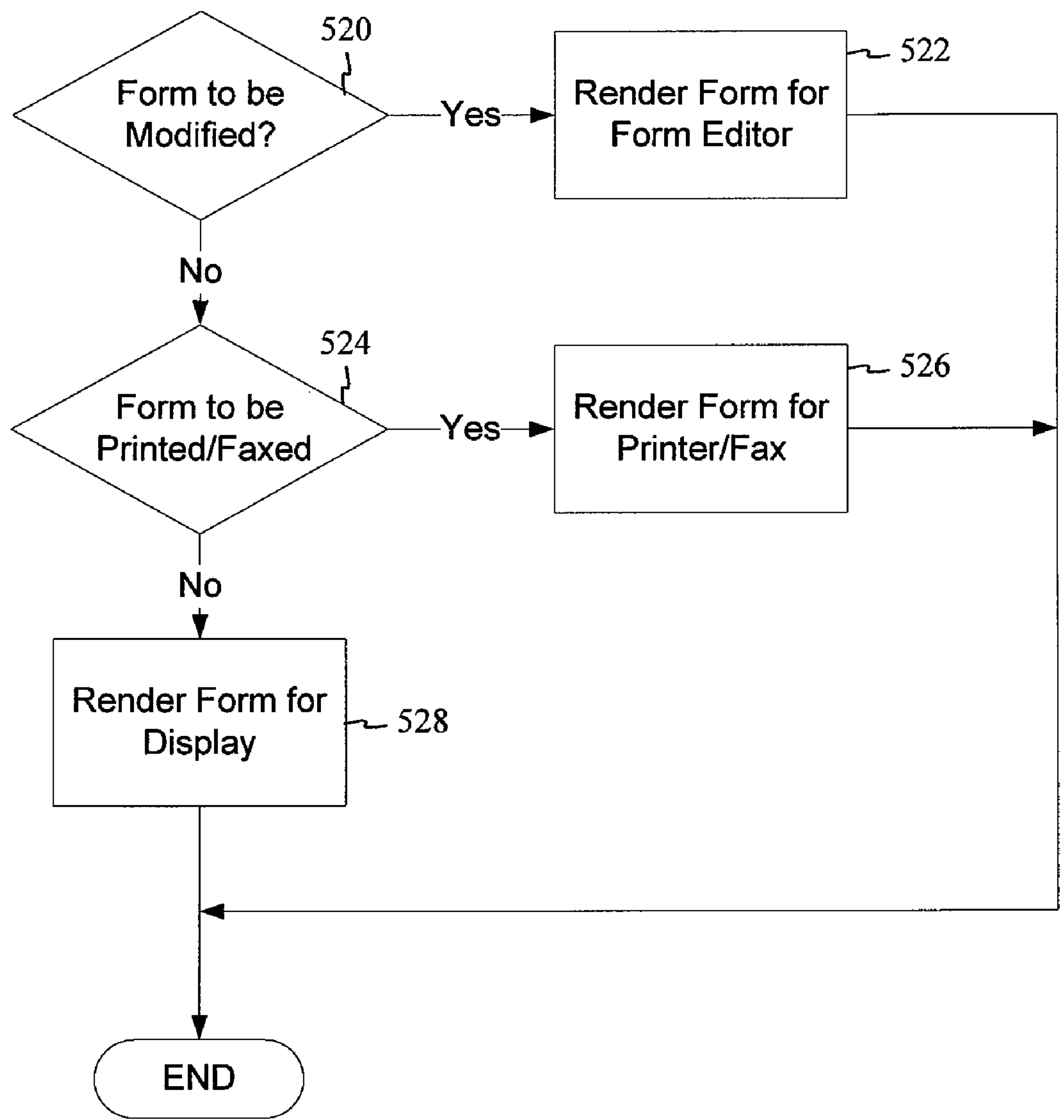
Figure 5C:
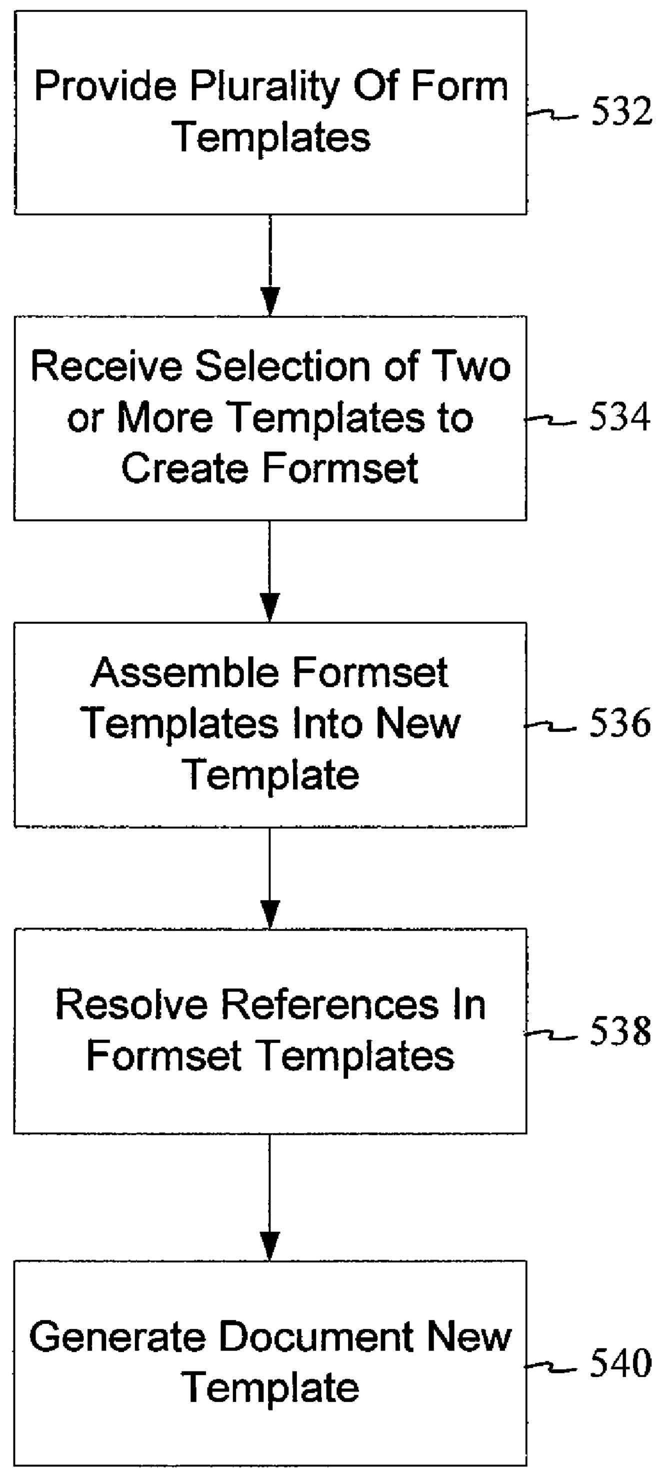

FIGS. 5A-5C are flowcharts illustrating methods according to example embodiments of the invention. The methods to be performed by the operating environment constitute computer programs made up of computer-executable instructions. Describing the methods by reference to a flowchart enables one skilled in the art to develop such programs including such instructions to carry out the method on suitable processors (the processor or processors of the computer executing the instructions from computer-readable media). The methods illustrated in FIGS. 5A-5C are inclusive of acts that may be taken by an operating environment executing an exemplary embodiment of the invention.

FIG. 5A illustrates a method for dynamically creating a document or form. The method begins by providing a set of form fragments (block 502). The form fragments may be provided by a content manager, such as content management server 106. Additionally, the form fragments may be provided from a database or a file system. The embodiments of the invention are not limited to any particular document or content storage mechanism.

The system then receives a selection of a form template (block 504). The candidate forms may be previously defined templates stored on content management system 106, or they may be master templates that provide an initial foundation for building forms. In some embodiments, the selection may be received through a web-based user interface in which a user is presented candidate form templates and the user then selects a form template that the user wishes to use as a base for the form. However, the embodiments are not limited to any particular type of user interface. The user interface may be provided by web server 102 using an application 110 on application server 104. In some embodiments, the application is written using the Java programming language and application components may be delivered from application server 104 in ".jar" (Java Archive) files. The application components may include the classes discussed above in reference to FIG. 4.

Next, the system receives a selection of one or more of the form fragments (block 506). Again, in some embodiments, the selection may be received through a web-based user interface in which a user is presented candidate form fragments and the user then selects those form fragments that the user wishes to include in a form. However, the embodiments are not limited to any particular type of user interface. The user interface may be provided by web server 102 using an application 110 obtained from application server 104.

The system then assembles the selected form fragments into the selected template (block 508). In some embodiments, the form fragments may be assembled in the order selected such that content for a first selected form fragment appears above later subsequently selected form fragments. In alternative embodiments, the form fragments may be assembled using program logic to determine the order of assembly. For example, the program logic may determine that header fragments appear above body content which appears above footer fragments. In some embodiments, an application loaded from application server 104 includes one or more of the methods in the "assemble" class described above. If the user desires to assemble a document for the purpose of modifying the document, the "assembleFragmentsForEdit( )" method may be called. In this case, the form fragments are assembled and made ready for editing in a document processing application. If the document is being assembled for viewing purposes only, the "assembleFragmentsForDisplay( )" method described above may be invoked. During the process of assembly, the fragments that are "link" fragments will be properly substituted in the selected template by following the link to obtain the component fragment referred to by the link. In an example embodiment where content management server 106 supports versioning of files, the latest version of the component fragment referred to by the link is obtained. Other fragments (e.g., component fragments) may be appended to the template.

The following XML excerpt illustrates a fragment assembled into a template according to an example embodiment of the invention:

```
<template name="template.xdp" GUID="DFFD57DB-6399-7878-3" INIT_GUID="E4683DCE-7F70- . . . 7">
  <subform name="fragment1.xdp" GUID="FC0714A0-7F70-DE0 . . . 7"/>
  <subform name="fragment2.xdp" GUID="C5855D4F-C190-D5F . . . 4"/>
  <subform name="fragment3.xdp" GUID="E4683DCE-BC58-983 . . . 3"/>
</template>
```

where:

| | |
|---|---|
| <template>: | root element that identifies the XDP as a template |
| <template name>: | attribute that identifies the name of the XDP template |
| <template GUID>: | unique identifier attribute that maps back to a content management system location. Used when a "snapshot" of the template is saved at runtime |
| <template INIT_GUID>: | unique identifier attribute that maps back to a content management system location. Used when the XDP template is initially saved to a content management system. |
| <subform name>: | name of the XDP template |

In the example above, three form fragments defined in files "fragment1.xdp", "fragment2.xdp", and "fragment3.xdp"

have been selected for insertion into a template defined in the file "template.xdp." After assembly, the template representing the assembled form may be saved to the content management system 106.

The system then proceeds to render the assembled template (block 510).

FIG. 5B is a flowchart providing further details on rendering a document assembled as described above in FIG. 5A. The method begins by determining if the assembled template was selected for the purpose of modifying the document (block 510). In some embodiments, the user interface provides a mechanism for such a selection. If so, the system proceeds to open a document editor that enables a user to edit some or all of the assembled document (block 512). In some embodiments, the document editor provides an indication of those portions of the document that are provided as part of a link fragment and those portions of the document that are provided by a content fragment. For example, in some embodiments, content provided by link fragments may be displayed in a different color from content provided by content fragments. The user may use the color cue to know which portions may be edited and which portions may not be edited.

If the document is not selected for editing, then the system determines if the document was assembled for the purpose of distributing the document via printing or faxing the document (block 514). If so, the document is rendered in a format suitable for printing or faxing (bock 516). In particular embodiments, methods from the "Render" class discussed above may be executed by the application server to render the document for printing. For example, an application on application server 104 may call the "distributeForPrint( )" method in the distribute class to cause application server 104 to prepare a document for distribution as a printed document.

In some embodiments, the document is rendered in a PostScript language format for those printers and fax systems that require PostScript language. In these embodiments, the application server 104 may call a pdfMMtoSimplePS( ) method to cause the form server 108 to render the document in a PostScript language format. In alternative embodiments, the document may be rendered in a PDF format for those printers or fax systems that accept PDF formatted documents. Additionally, in the case of faxing, a control file may be created that contains the parameters to be used for faxing the rendered document (e.g. destination fax number, file location etc.). In some embodiments, application server 104 may call the "distribute" class method "distributeForFax( )" in order to prepare a document for faxing. In addition, the "createControlFile( )" method may be called to create a control file containing parameters relevant to faxing the document such as destination fax number, call times etc.

Otherwise, the system may render the template for display (block 518). Some documents may be rendered with fillable form portions. A fillable form portion is a portion of a form having one or more fields in which a user may supply data. The data supplied by the user is stored in the document, and the data may be included in the fields when the document is rendered for displaying or printing. In some embodiments, those portions may be "flattened" such that the form may not be filled in with data provided by a user. Flattening refers to rendering a form that is defined as a fillable form (e.g. an interactive form that defines fields that may be filled in on-line by a user) in a manner such that the fields are not filled in, rather they are left blank. This may be used when it is desirable to print the document with blank fields. In alternative embodiments, the portion may be rendered such that the user may provide data in the fields of the form, and the form saved along with the user's data.

FIG. 5C illustrates a method for dynamically creating a formset. The method begins by providing a plurality of templates available for selection (block 532). The templates available for selection may be designed using the methods described above in FIG. 5A, and be stored on content management server 106. The templates made available for selection will generally be top-level templates that provide a definition for a form. An application 110 will typically determine which templates to display for selection, and provide the available templates on a user interface displayed via web server 102.

Application 110 then receives a selection of two or more templates to be included in the formset (block 534). Again, in some embodiments, the selection may be received through a web-based user interface in which a user is presented candidate form fragments and the user then selects the templates that the user wishes to include in a formset. However, the embodiments are not limited to any particular type of user interface.

The application 110 then proceeds to assemble the selected templates into a formset (block 536). In an example embodiment, the templates are assembled in the order selected by the user. In some embodiments, the system reads each template file in the formset and merges the contents of template file into a single "superform" that is a merger of the forms defined by the templates in the formset, which in turn may be defined using form fragments. As discussed above, in example embodiments, the templates may be defined as XDP files. A method used in an example embodiment, "assembleMultipleTemplates", combines multiple XDP files into a single XDP file. In some embodiments, the combining the XDP files includes reading the form fragments in each of the templates of the formset and including the fragments onto a single new template defined by the formset. Component fragments may be appended directly onto the new template. For link fragments, the component fragment referenced by the link may be obtained and inserted into the new template. In those embodiments supporting version of XDP files, the latest version of a fragment may be appended to the new template file.

In an example embodiment, all templates after the first template in a formset are inserted as additional pages to the first template. Any global scripts present in the templates are maintained for the first template. Page definitions (body and master) are kept for subsequent templates in the formset.

As noted above, a template may have references to objects within the form defined by the template. These references include layout related references such as page size references, page orientation references, and page numbering references. These references are typically unique within the form, but may not be unique across forms. As a result, there can be collisions between references. For example, assume that template A defines a portrait legal size form and template B defines a letter size landscape form. Further assume that each template uses the same reference identifier (e.g., a reference index) to refer to objects defining the page size and orientation. Additionally, each template will typically attempt to define a page numbered 1. In this case there is a collision between the templates. An attempt to render a template comprising the templates A and B in the formset may result in the no form being rendered, or in the form portion defined by template B being rendered improperly.

In order to prevent the improper rendering of templates in formset, an example embodiment resolves conflicting references in formset templates (block 538). The application scans the fragments to determine if conflicting references exist. If a conflicting reference exists, a new reference is generated for the object, and the new reference is used in the referring fragment. In particular embodiments, application 110 will re-index master pages defining the page orientation and sizes for a form to allow the individual forms being assembled and merged to maintain their original page layout and orientation after merger into a form package defined by the formset. The re-indexing process comprises generating a new index for the indexed object that is unique across all of the templates in a formset, and replacing the old index with the new, unique index. In addition, any references to the old index are replaced with the new unique index. In addition to page size and page orientation objects, page number objects may also be re-indexed. Similarly, unique identifiers may be re-indexed. In general, any form reference that conflicts may have a new, unique reference generated.

After the application has merged and resolved conflicting references, the new form template representing the merged templates in the formset may be saved. In addition, the new form template may be rendered as discussed above with reference to FIG. 5B.

The new form template may be used to generate a document (block 540). In an example embodiment, the new form template may be used go generate multiple types of documents. For example, the new form template may be used to generate a PDF document or an HTML document. The ability to generate multiple document types is aided by defining formsets, templates, forms, form fragments using XDP. The XDP definitions may be traversed, and the code specific to the desired document type may be generated.

Figure 6A:
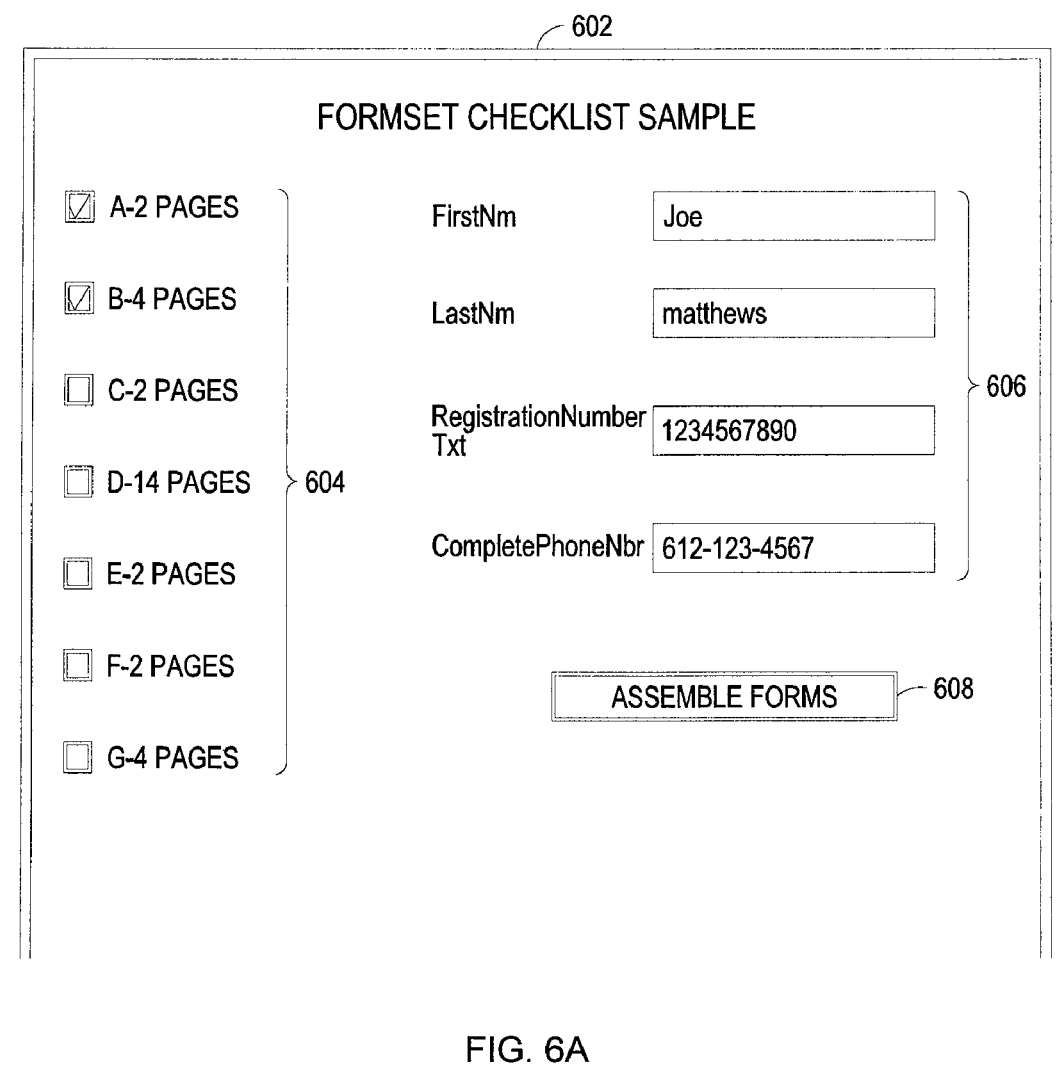

FIGS. 6A and 6B are example screen shots illustrating user interfaces according to embodiments of the invention. FIG. 6A illustrates an example selection interface 602 according to some embodiments of the invention. The example user interface provides a mechanism for a user to select templates for inclusion in a formset. The example user interface may be presented by a web server 102 to a web browser client. In some embodiments, the web server obtains application code to generate the user interface from an application server 104. The example interface includes template list 604, form data fields 606, and assemble button 608. Template list 604 includes a list of templates available for selection. The template list 604 may be ordered in the order that templates will be assembled if selected, or the list may be unordered. Further, in some embodiments, the templates will be assembled in the order they are selected. In some embodiments, a check-box may be used to select a template. In alternative embodiments, a list of templates may be presented in a first data field. As templates are selected, the template name may be placed in a second data field of the user interface. The templates listed in the second data field may be retrieved and assembled into the formset. Those of skill in the art will appreciate that other selection mechanisms may be used and are within the scope of the embodiments of the invention.

Form data fields 606 contain data input fields that may be used to prepopulate portions of an assembled formset.

Assemble button 608 may be used to indicate that the user is finished selecting templates and that the system should proceed to assemble the selected templates into a formset.

FIG. 6B is an example user interface screen 610 according to embodiments of the invention. In some embodiments, user interface screen 610 includes the elements illustrated in FIG. 6A, with the addition of a rendered forms panel 612 having images of rendered forms 614 in a formset. Like example user interface 602, example user interface 610 may be presented by a web server 102 to a web browser client. In some embodiments, the web server obtains application code to generate the user interface from an application server 104. In some embodiments, the rendered forms 614 are "thumbnail" images of the rendered formset. Upon selection of a thumbnail image, the system presents a larger view of the formset.

Figure 7:
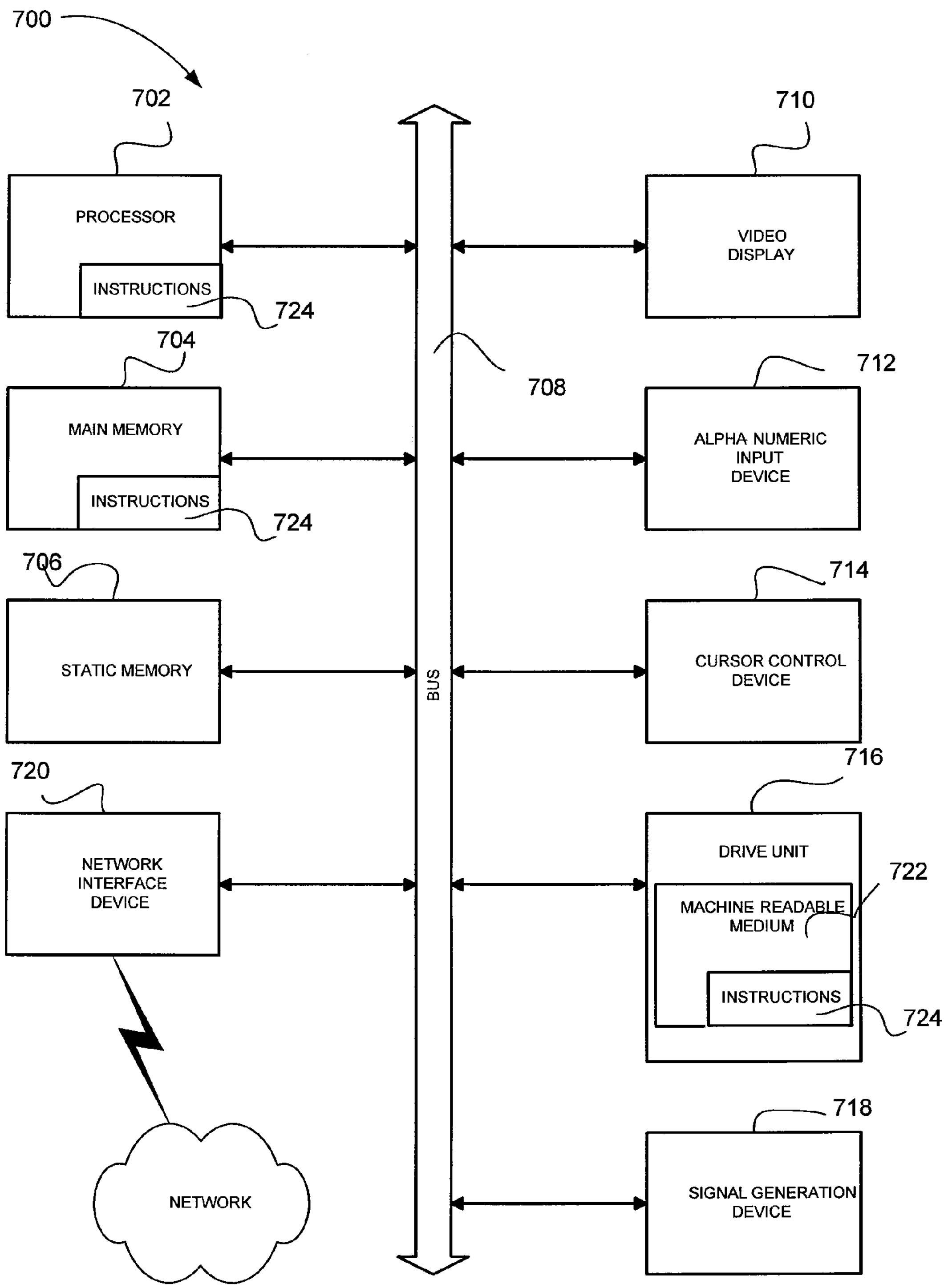
FIG. 7 is a block diagram illustrating components of a computing device that may execute systems and methods according to embodiments of the invention.

FIG. 7 is a block diagram illustrating major components of a computer system 700 within which a set of instructions, for causing the machine to perform any one or more of the methodologies discussed herein, may be executed. In alternative embodiments, the machines operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720. The network 726 may be any type of wired or wireless network and the network interface 720 may vary based on the type of network. In some embodiments, the network comprises a LAN (local area network). In alternative embodiments, the network may be a wide area network, a corporate network, or an intranet linking multiple networks. In further alternative embodiments, the network may comprise the Internet.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical media, and magnetic media.

Systems and methods to perform runtime assembly of selected form fragments into a template have been described. Although the present invention has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. An apparatus comprising:

a memory;

a processor communicatively coupled to the memory;

a repository to maintain a plurality of templates, the templates having form fragments;

a selection interface to receive a selection of templates from the plurality of templates; and a processor-implemented assembly component to:

retrieve the selection of templates from the repository;

assemble the selection of templates into a formset;

merge, in the memory and using the processor, the form fragments in the selection of templates in the formset to a new template; and resolve, using the processor, a conflict between object references for the form fragments in the new template.

2. The apparatus of claim 1, wherein the form fragments are defined using a version of XDP (eXtensible markup language Data Packaging).

3. The apparatus of claim 1, wherein the object reference comprises an object index.

4. The apparatus of claim 1, wherein the object reference comprises a page number reference.

5. The apparatus of claim 1, wherein the object reference comprises a page orientation reference.

6. The apparatus of claim 1, wherein the assembly component obtains a component fragment referred to by a link fragment.

7. The apparatus of claim 6, wherein the component fragment comprises a latest version of the component fragment.

8. The apparatus of claim 1, further comprising a form server to receive the new template and to prepare the new template for distribution.

9. The apparatus of claim 8, wherein the form server prepares the new template for distribution by fax.

10. A method comprising:

providing a plurality of templates, the templates including form fragments having object references;

receiving a selection of first templates from the plurality of templates;

creating a formset from the first templates;

assembling, in a memory of a machine and using a processor of the machine, the form fragments in the first templates to a second template; and resolving, using the processor, a conflict between object references for the form fragments in the second template.

11. The method of claim 10, wherein resolving object references includes recalculating index references.

12. The method of claim 10, wherein resolving object references includes resolving a page reference.

13. The method of claim 10, wherein resolving object references includes resolving a page orientation reference.

14. The method of claim 10, wherein merging the form fragments includes merging a component fragment referred to by a link fragment.

15. The method of claim 14, wherein merging a component fragment includes obtaining a latest version of the component fragment.

16. The method of claim 10, further comprising generating a document from the second template.

17. The method of claim 16, wherein generating the document generates a PDF Portable Document Format (PDF) document.

18. The method of claim 16, wherein generating the document generates a Hyper Text Markup Language (HTML) document.

19. The method of claim 10, further comprising:

providing a plurality of form fragments;

receiving a selection of first form fragments from the plurality of form fragments; and assembling the first form fragments to create a template in the plurality of templates.

20. A machine-readable medium embodying instructions that, when executed by one or more processors of a machine, cause the machine to perform a method comprising:

providing a plurality of templates, the templates including form fragments having object references;

receiving a selection of first templates from the plurality of templates;

creating a formset from the first templates;

assembling, in a memory of the machine and using the one or more processors of the machine, the form fragments in the first templates to a second template; and resolving, using the one or more processors, a conflict between object references for the form fragments in the second template.

21. An apparatus comprising:

first means for providing a plurality of templates, the templates including form fragments having object references;

second means for receiving a selection of first templates from the plurality of templates; and third means for:

creating a formset from the first templates;

assembling the form fragments in the first templates to a second template; and resolving a conflict between object references for the form fragments in the second template.

* * * * *

UNITED STATES PATENT AND TRADEMARK OFFICE

CERTIFICATE OF CORRECTION

PATENT NO. : 7,734,995 B1
APPLICATION NO. : 11/293625
DATED : June 8, 2010
INVENTOR(S) : Danny Saikaly It is certified that error appears in the above-identified patent and that said Letters Patent is hereby corrected as shown below:

In column 16, line 19, in Claim 17, after “a” delete “PDF”.

Signed and Sealed this

Fourteenth Day of September, 2010

David J. Kappos
*Director of the United States Patent and Trademark Office*